United States Patent [19]

McNeely

[11] Patent Number: 4,682,495
[45] Date of Patent: Jul. 28, 1987

[54] TESTING DEVICE FOR PILOT VALVES

[75] Inventor: Michael D. McNeely, Katy, Tex.

[73] Assignee: Anderson, Greenwood & Company, Houston, Tex.

[21] Appl. No.: 863,080

[22] Filed: May 14, 1986

[51] Int. Cl.$^4$ ............... F16K 37/00; G01M 19/00
[52] U.S. Cl. ................... 73/168; 116/277; 137/488; 137/322
[58] Field of Search ............ 73/168, 46; 116/277

[56] References Cited

U.S. PATENT DOCUMENTS 3,699,810 10/1972 Takahashi ............... 73/168
4,384,591 5/1983 Tan ...................... 73/168 X
4,609,008 9/1986 Anderson, Jr. et al. ...... 137/488

*Primary Examiner*—Daniel M. Yasich
*Attorney, Agent, or Firm*—Vinson & Elkins

[57] ABSTRACT

A testing device (22) for a non-flowing pilot valve (20) controlling a main relief valve (13) and simulating the action of the relief valve (13). The testing device body (84) has a test fluid source (42) releasably connected thereto and includes a piston valve element (112) mounted in a valve chamber (106) for movement to an unseated vent position upon the test fluid pressure reaching a predetermined high which is usually similar to the set point operating fluid pressure at which the main relief valve (13) will actuate. For return of piston valve element (112) to a seated position after a reduction of the test fluid pressure by venting, a relatively large diameter end face (128) is exposed to fluid pressure from an intermediate fluid chamber (78) of the pilot valve (20) which is in fluid communication with the dome (14) of the pressure relief valve (13). A relatively small fluid pressure responsive area of piston (113) outwardly of small diameter O-ring (120) is exposed to test fluid pressure.

15 Claims, 5 Drawing Figures

TESTING DEVICE FOR PILOT VALVES

BACKGROUND OF THE INVENTION

This invention relates to a testing device for a pilot valve controlling a main valve in a main flow line, and more particularly to such a testing device and testing method for a so called non-flowing pilot valve which is non-flowing during normal operation.

A non-flowing pilot valve does not permit direct fluid communication between its inlet and outlet fluid chambers as an intermediate fluid chamber is provided between the inlet and outlet fluid chambers and a valve member in the intermediate chamber prevents direct fluid communication between the inlet and outlet chambers. The inlet chamber is normally a fluid sensing chamber having a sensing diaphragm therein. The main valve, which may be a pressure relief or throttling control valve, normally has a so called dome with a pressure responsive member therein, such as a diaphragm or piston, which is responsive to fluid pressure from the intermediate chamber of the pilot valve. The intermediate fluid chamber is never in simultaneous fluid communication with both the inlet and outlet fluid chambers. Thus, in a non-flowing pilot valve, there is no continuous fluid flow through the pilot valve from a bypass line extending from the main flow line as the inlet and outlet lines to the pilot valve are never in simultaneous fluid communication with the intermediate chamber.

The elimination of a continous fluid flow through the pilot valve removes many of the problems in pilot valves having a continuous fluid flow such as, for example, the clogging of orifices and the like with entrained foreign matter in the flowing fluid, or icing resulting from wet gas applications. While a relatively small amount of fluid may be transmitted through the pilot valve during operation, this amount is insignificant.

Such a non-flowing pilot valve is highly sensitive or responsive to changes in the sensed fluid pressure. The responsiveness of the non-flowing pilot valve to pressure changes in a sensed fluid is relatively constant over its operating range and a non-flowing pilot valve has a fast response to pressure changes in the sensed fluid.

It is desirable to have field testing of such a non flowing pilot valve periodically to insure that the pilot valve is operating properly and without such testing affecting the normal operation of the main valve. For such a testing operation or procedure when the main valve is a pressure relief valve, it is necessary to inject test pressure from an auxiliary fluid pressure source into the sensing chamber of the pilot valve in order to simulate an increase in fluid pressure from a main flow line or fluid tank, for example. The fluid inlet sensing chamber for a pilot valve normally has a sensing diaphragm therein and if test pressure is applied to the sensing chamber above the fluid pressure set point for the main pressure relief valve, an over pressurizing of the diaphragm chamber could occur which might damage the pilot valve. Also, if the fluid pressure in the inlet sensing chamber rises above the set fluid pressure for the main pressure relief valve this would normally result in a proportional decrease of dome fluid pressure to the main valve thereby allowing opening of the pressure relief valve which is not desirable for a testing operation.

SUMMARY OF THE INVENTION

The present invention is particularly directed to a test device for a non-flowing pilot valve which may be formed as an integral part of the pilot valve, or removably connected to the pilot valve or its associated fluid system. The test device includes a pressure responsive valve member therein which simulates the action of a main pressure relief valve and is designed to unseat at the set point pressure for the relief valve.

The valve member for the testing device which simulates the action of a main relief valve is exposed on one side thereof to the dome fluid pressure of the relief valve which urges the test valve member to a seated position against the influence of the test fluid pressure. The fluid pressure area of the test valve member exposed to dome fluid pressure is greater than the fluid pressure area thereof exposed to test fluid pressure, and this pressure differential area is designed so that the test valve member is unseated and vents to atmosphere when the test fluid pressure reaches the set point pressure of the relief valve, such as 500 psi, for example. At such set point pressure, the dome fluid pressure has been reduced, for example, to around seventy percent (70%) of the test fluid pressure. As a result of the fluid pressure differential areas on the test valve member, the seating and unseating of the test valve member occurs without any actuation of the main relief valve. Thus, the test device can be utilized for effective testing of a non-flowing pilot valve to determine if it is functioning properly at the set point pressure without opening the main valve.

The test device utilizes an auxiliary fluid supply source which is releasably connected to the test device during the testing operation through a so called quick disconnect as is well known. Upon the exertion of a test fluid pressure greater than the inlet fluid pressure, the inlet fluid pressure to the sensing chamber of the pilot valve is blocked by a shuttle valve member and the pilot sensing chamber is then solely in fluid communication with the test fluid pressure for increasing the fluid pressure to the desired pressure level, such as the set pressure for the main pressure relief valve.

The test valve member which simulates the action or fluid pressure responses from a main relief valve comprises a piston having a reduced diameter portion on one end fitting within a vent opening with an O-ring around the reduced diameter portion sealing about the vent opening in the seated position of the valve member. The other end of the piston is exposed to dome fluid pressure and urges the piston into seated position. The piston has a differential pressure area designed so that it will be unseated for venting at a test pressure corresponding to the set pressure point of a main relief valve, such as 500 psi, for example. Then, upon a reduction of the test fluid pressure to around four hundred and eighty (480) psi the piston will be returned to seated position under the influence of increased dome fluid pressure acting on the piston. Thereafter a buildup of test pressure back to five hundred psi will occur and the piston will again be unseated. After two or three sequences of seating and unseating of the piston, the testing operation may be terminated with a removal of the auxiliary test fluid source.

The fluid pressure in the inlet sensing chamber of the pilot valve is always in fluid communication with either the auxiliary test fluid pressure or operating fluid pressure, whichever is greater, as a result of a shuttle check valve in fluid communication on opposite sides thereof with both the auxiliary test pressure and the operating fluid pressure. The check valve moves in response to the higher fluid pressure to provide fluid communication between the higher pressure and the pilot sensing chamber.

It is an object of this invention to provide a test device for testing the functioning of a non-flowing pilot valve which controls a main valve.

It is a further object of this invention to provide an improved method for testing a non-flowing pilot valve which controls a main valve, such as a pressure relief valve.

It is an additional object of this invention to provide such a testing device having a test valve member therein which simulates the relief valve member of a main relief valve and provides suitable testing of the pilot valve without actuation or opening of the main valve.

Another object is to provide a test valve member for such a testing device which is in fluid communication with the dome fluid pressure of the main valve and is movable between an unseated vent position upon the reaching of a predetermined high test fluid pressure and a return seated position resulting from a subsequent increase in dome fluid pressure.

An additional object of this invention is to provide in such a test device for a non-flowing pilot valve means for permitting the higher of either the operating fluid pressure or test fluid pressure to be in fluid communication with the fluid inlet sensing chamber of the pilot valve with the other fluid pressure being blocked to the sensing chamber.

Other objects, features, and advantages of this invention will become more apparent after referring to the following specification and drawings.

DESCRIPTION OF THE INVENTION

Figure 3:
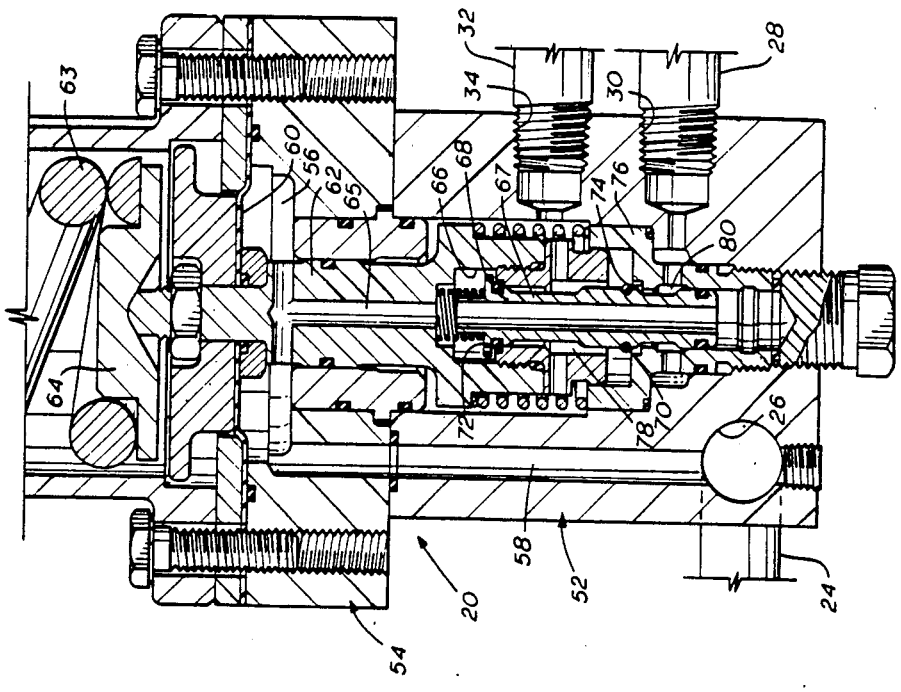
FIG. 3 is a sectional view of the pilot valve similar to FIG. 2 but showing the position of the diaphragm and spool valve for the intermediate fluid chamber upon an increased fluid pressure in the fluid inlet sensing chamber with fluid flow being provided between the intermediate fluid chamber and the fluid outlet chamber to permit flow therebetween.
Figure 2:
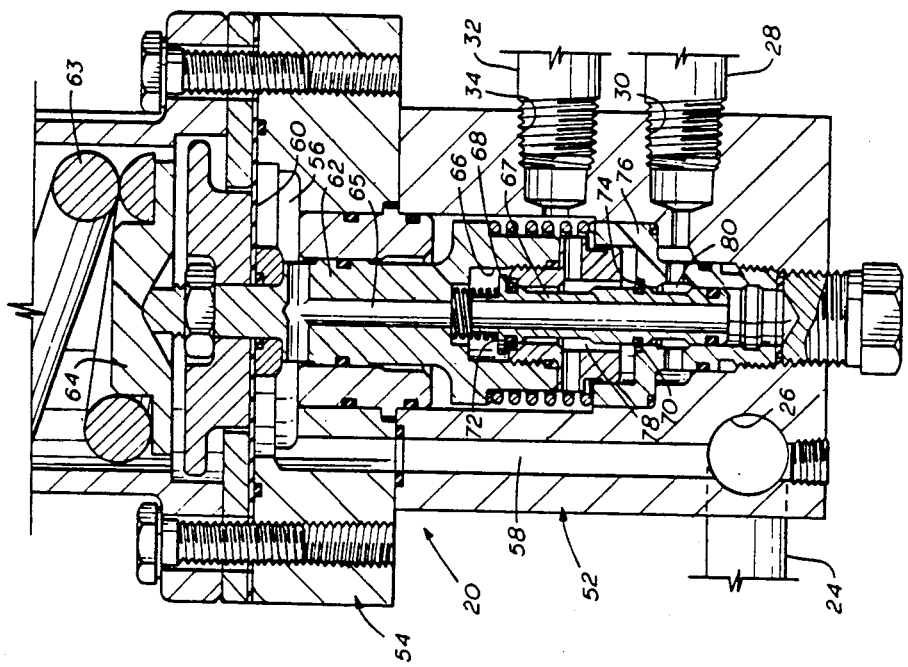
FIG. 2 is a sectional view of the associated pilot valve showing the pilot valve in a normal operating position in which fluid flow is blocked to the intermediate fluid chamber from the fluid inlet chamber and the fluid outlet chamber.
Figure 4:
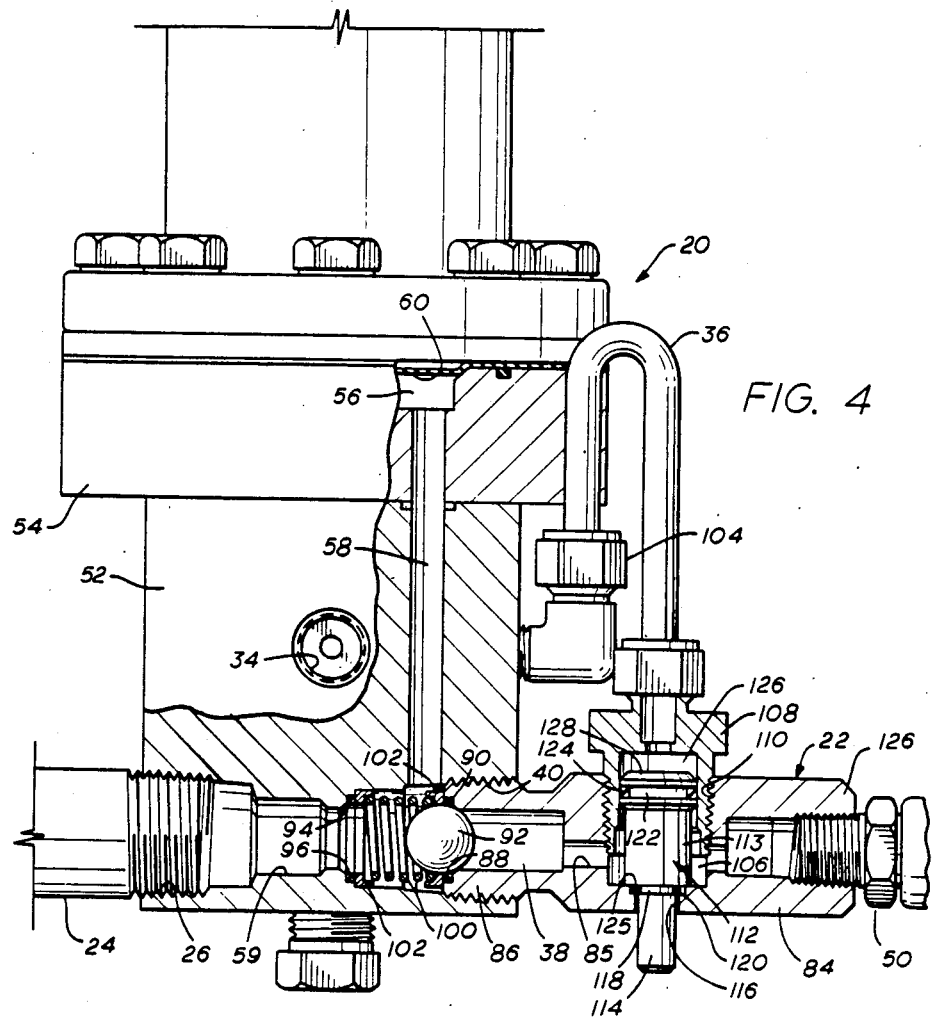
Figure 5:
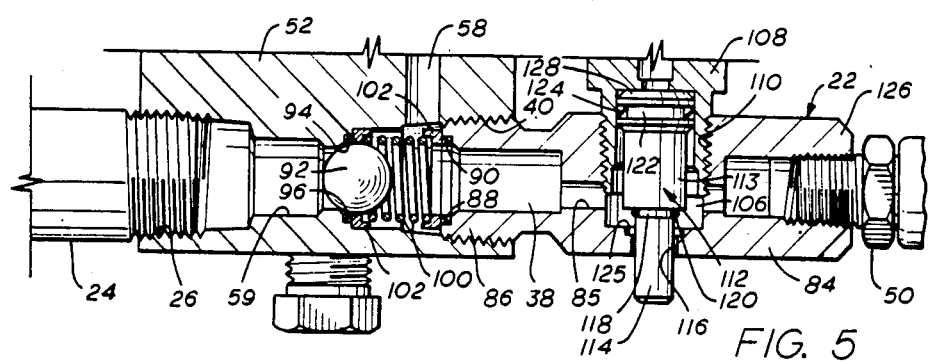

FIG. 4 is a sectional view of the test device of the present invention attached to the associated pilot valve of FIGS. 2 and 3 and showing the test device prior to being connected to an auxiliary pressure source for the testing operation; and FIG. 5 is a partial sectional view similar to FIG. 4 showing the test device in fluid communication with a source of auxiliary test fluid, the shuttle check valve blocking the flow of operating fluid to the pilot sensing chamber and the valve member of the test device shown in unseated position to vent auxiliary test fluid to atmosphere.

Figure 1:
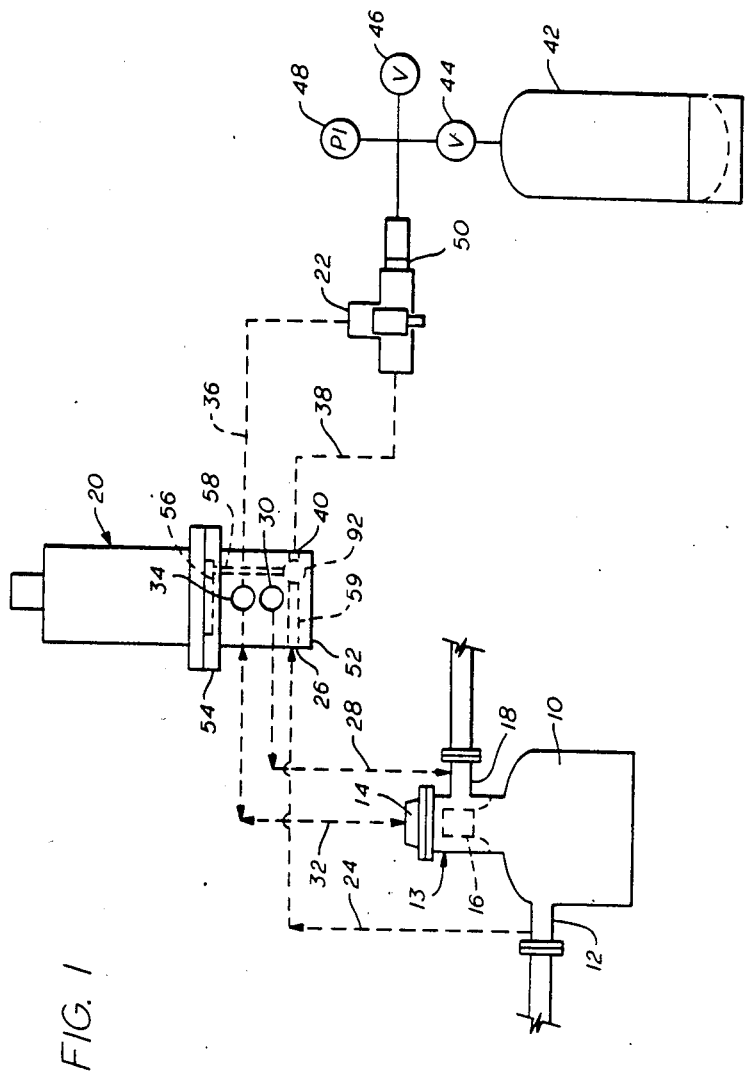
FIG. 1 is a schematic of a fluid system for the test device of the present invention and illustrating a fluid system having a non-flowing pilot valve for controlling an associated main valve having a dome therein in fluid communication with an intermediate fluid chamber of non-flowing pilot valve.

Referring now to drawings for a better understanding of this invention, and more particularly to FIG. 1, a typical system in which the present invention is adapted for use is shown. The fluid system includes a pressure vessel or tank indicated at 10 having a main flow line 12 extending therefrom. A main relief valve 13 is provided for tank 10 including a dome 14 with a pressure responsive element therein, such as a relief piston illustrated at 16 to permit flow from tank 10 outlet line 18 upon fluid pressure in tank 10 reaching a predetermined maximum thereby to prevent over-pressurizing of tank 10.

A non-flowing pilot valve is shown generally at 20 and is associated with an auxiliary testing device comprising the present invention illustrated generally at 22. An inlet fluid line 24 extends from main flow line 12 to fluid inlet port 26 of pilot valve 20. An outlet fluid line 28 extends between outlet line 18 and outlet port 30 of pilot valve 20. An intermediate fluid line 32 extends between dome 14 of tank 10 and an intermediate port 34 of pilot valve 20.

A dome branch line 36 extends from intermediate port 34 to test device 22. A test fluid inlet line or passage 38 extends from test device 22 to test fluid inlet port 40 of pilot valve 20. A source of auxiliary test fluid is illustrated at 42, such as a nitrogen gas cylinder, and a manually operated outlet valve 44 controls the flow of gas from auxiliary test fluid source 42. A manually operated vent valve 46 is provided to bleed the test fluid line prior to removal of test fluid source 42. A fluid pressure gauge 48 indicates the test fluid pressure may be monitored. The auxiliary test fluid source 42 is connected to test device 22 when it is desired to test pilot valve 20 and a suitable quick disconnect shown at 50 is utilized for such connection, as well known in the art. Quick disconnect 50, may, for example, be normally closed by a spring urged ball check valve which is moved to an open position by a suitable stinger or insert from test fluid source 42 upon connection.

Pilot valve 20 has a main body comprising a generally cylindrical lower body portion 52 and a connected generally cylindrical upper body portion 54. A fluid inlet sensing chamber 56 in upper body portion 54 is in fluid communication with operating fluid inlet 26 or test fluid inlet 40 through a longitudinally extending bore 58 and a cross bore 59 in body portion 52 between inlets 26 and 40 communicating with bore 58, as shown particularly in FIGS. 4 and 5. A diaphragm 60 is responsive to fluid pressure in sensing chamber 56 and a piston member 62 secured thereto is urged downwardly by an adjustable spring 63 acting on a follower 64 engaging the upper end of piston 62. Piston 62 has a central bore 65 leading to an enlarged diameter internal bore 66 at its lower end which receives a spool valve 67 therein. Spool valve 67 has a pair of O-ring seals 68 and 70 thereabout for seating on respective internal seat 72 of piston 62 and fixed seat 74 of stop member 76. An intermediate fluid chamber 78 is provided between O-rings 68 and 70 and is in fluid communication with intermediate fluid line 32 to dome 14. An outlet fluid chamber 80 is provided below O-ring 70 in fluid communication with outlet fluid line 28.

In the normal operating position of pilot valve 20 as shown in FIG. 2, O-ring seals 68 and 70 are seated on respective seats 72 and 74 thereby blocking fluid communication between intermediate fluid chamber 78 and inlet and outlet fluid chambers 56, 80. There is never any direct fluid flow between inlet sensing chamber 56 and outlet chamber 80 as intermediate fluid chamber 78 is positioned therebetween and O-rings 68 and 70 are never unseated simultaneously.

Referring now to FIG. 3, the position of pilot valve 20 is illustrated in which inlet sensing chamber 56 is exposed to a high fluid pressure either from the operating fluid pressure from inlet line 24, or the test fluid pressure through fluid passage 38 provided by test device 22. Diaphragm 60 is moved upwardly by such high fluid pressure against the bias of spring 63. Upward movement of piston 62 with diaphragm 60 moves spool valve 67 upwardly to unseat O-ring 70 and permit fluid communication between intermediate fluid chamber 78 and outlet fluid chamber 80. In this position, the fluid pressure in intermediate fluid chamber 78 and dome 14 will be reduced as the fluid pressure in outlet fluid chamber 80 is lower than the fluid pressure in intermediate fluid chamber 78.

In the event fluid pressure in dome 14 and intermediate chamber 78 reaches a predetermined low in response to the high fluid pressure in sensing chamber 56, relief valve 16 will be opened to permit tank 10 to be depressurized. Upon a decrease of fluid pressure in sensing chamber 56, spool valve 67 will reseat on seat 74 thereby to again block flow between outlet fluid chamber 80 and intermediate fluid chamber 78. In the event fluid pressure in the fluid sensing chamber 56 reaches a predetermined low, O-ring 68 will unseat while O-ring 70 is seated, thereby permitting fluid communication between inlet fluid sensing chamber 56 and intermediate chamber 78. For further details of pilot valve 20 and its functioning, reference is made to co-pending application Ser. No. 774,809 filed Sept. 11, 1985 now U.S. Pat. No. 4,609,008, dated Sept. 2, 1986, the entire disclosure of which is incorporated by this reference.

Referring now to FIGS. 4 and 5, test device 22 is shown removably attached to pilot valve 20. Test device 22 has a main body 84 with an externally threaded end portion 86 threaded within internally threaded test inlet port 40. An O-ring groove 88 at the end of end portion 86 has an O-ring 90 therein. A ball shuttle valve 92 is seated against O-ring 90 during normal operation before auxiliary test fluid source 42 is connected to test device 22 and fluid inlet sensing chamber 56 is in communication with operating fluid pressure from line 12. Cross bore 59 extending between inlets 26 and 40 has a shoulder 94 therein receiving an O-ring 96. A guide spring 100 is biased between opposed spring retainers 102 adjacent O-rings 90 and 96. Spring guide 100 guides the movement of shuttle valve 92 between seated positions on O-rings 90 and 96. Upon the connection of the test fluid pressure source 42, ball valve shuttle 92 moves to the position shown in FIG. 5 when the test fluid pressure is greater than the operating fluid pressure in line 24 and operating fluid pressure from line 24 is blocked.

Branch line 36 is removably connected to fitting 104 connected to intermediate fluid port 34. A generally cylindrical piston valve chamber 106 is defined by main body 84 and an externally threaded piston housing 108 threaded within an internally threaded opening 110 of body 84. A piston valve element generally indicated 112 is mounted within valve chamber 106. Piston valve element 112 includes a piston 113 extending within housing 108 and a reduced diameter end portion or plunger 114 extending therefrom through an opening 116 in main body 84. Opening 116 provides a vent to atmosphere for chamber 106 upon unseating of valve element 112 as shown in FIG. 5. An annular groove 118 about reduced diameter end portion 114 receives O-ring 120 and an annular groove 122 about piston 113 receives O-ring 124. O-ring 120 seals against abutment 125 in the seated position of piston valve element as shown in FIG. 4, and O-ring 124 seals against housing 108. An upper fluid chamber portion 126 is provided above O-ring 124 with end face 128 of piston 113 exposed to fluid pressure from line 36 and intermediate fluid chamber 78 to urge piston element 112 toward the seated position shown in FIG. 4. The pressure responsive area of piston element 112 exposed to test fluid pressure in chamber 106 in the seated position of piston element 112 is the area outwardly of O-ring 120. Thus, a fluid pressure differential area is provided by piston element 112.

For example, if relief valve 16 in tank 10 is set to open at five hundred (500) psi and an operating fluid pressure is provided in line 12 of around two hundred and fifty (250) psi, the fluid pressure effective or responsive areas of piston valve element 112 provided by end face 128 and the area outwardly of O-ring 120 may be designed so that piston element 112 will unseat at a test fluid pressure of five hundred (500) psi which is sensed in fluid inlet sensing chamber 56. The so-called dome pressure in intermediate chamber 78 and lines 32, 36 will be reduced upon unseating of spool valve 67 in proportion to the test fluid pressure, but as a result of the differential areas on piston element 112 the dome fluid pressure will reach only around seventy percent (70%) of the test fluid pressure of five hundred (500) psi in order to unseat piston valve element 112 thereby permitting testing of pilot valve 20 without actuation of relief valve 16. The dome pressure which is seventy percent (70%) of five hundred (500) psi will be three hundred and fifty (350) psi but still significantly higher than the operating pressure of two hundred and fifty (250) psi in line 12. Thus, the main relief piston 16 will remain closed during the entire testing cycle.

In operation, when it is desired to test pilot valve 20 to determine if it is functioning properly at the set point pressure of relief valve 13, auxiliary test fluid source 42 is releasably connected to inlet 126 of test device 22 by a quick disconnect 50, and auxiliary test fluid is applied through central bore 85 against ball shuttle valve 92 upon opening of valve 44. When the test fluid reaches a fluid pressure higher than the operating fluid pressure in inlet line 24, ball shuttle valve 92 moves to the position shown in FIG. 5 to block fluid from inlet line 24 and permit test fluid flow to fluid inlet sensing chamber 56. An increase in test fluid pressure moves diaphragm 60 and piston 62 to the position shown in FIG. 3 in which O-ring 70 of spool valve 67 is unseated and fluid pressure lines 32, 36 are in fluid communication with outlet fluid line 28. When the test fluid pressure reaches five hundred (500) psi as shown on gauge 48, piston valve element 112 is unseated and moved to the position shown in FIG. 5 in which auxiliary test fluid is vented to atmosphere through opening 116 thereby resulting in a reduction of test fluid pressure. When the test fluid pressure drops, for example, to around four hundred and eighty (480) psi, the increasing fluid pressure in line 36 acting against end face 128 will return piston valve element 112 to seated position as shown in FIG. 4. Thus, piston valve element 112 will reseat before relief valve 16 is actuated. After reseating of valve element 112, test fluid pressure will again increase to five hundred (500) psi for actuation of piston element 112 again. After two or three actuations of piston element 112, the functioning of pilot valve 20 will be verified. Then, valve 44 will be closed and vent valve 46 opened to bleed the test fluid. Shuttle valve 92 will return to the position of FIG. 4 when test fluid pressure reaches a pressure level below the operating fluid pressure. Test fluid source 42 is then removed from quick disconnect 50. It is noted that shuttle valve 92 prevents at all times the operating fluid pressure in line 12 from reaching piston element 112. Thus, test device 22 is isolated from the normal operation of pilot valve 20.

Test device 22 may be utilized as an accessory for pilot valve 20 and applied to or removed from pilot valve 20 at any time. If removed, body 84 is unthreaded from inlet 40 and shuttle valve 92 with associated O-rings and spring guide may be removed. A suitable plug can then be threaded within inlet 40.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In a fluid system having a non-flowing pilot valve for controlling a main pressure relief valve having a dome and pressure responsive element therein, the pilot valve having a fluid inlet sensing chamber including a fluid inlet line thereto, a fluid outlet chamber, and an intermediate fluid chamber between said inlet and outlet chambers in fluid communication with the dome of the main relief valve;
   a fluid testing device for testing the functioning of said pilot valve in controlling the main relief valve, said testing device comprising:
   a body having a test fluid inlet adapted to be connected to a test fluid pressure source for supplying test fluid to the testing device;
   a fluid responsive shuttle valve member positioned within said fluid inlet line to the fluid inlet sensing chamber of said pilot valve, said shuttle valve exposed on opposite sides thereof to operating fluid pressure from said inlet line and test fluid pressure from said test inlet, said shuttle valve member movable by the higher fluid pressure between one position permitting fluid flow between the operating fluid pressure source and the fluid sensing chamber while blocking fluid flow from said test inlet, and a second position permitting fluid flow from the test inlet to the sensing chamber while blocking fluid flow from the operating fluid pressure source; and
   a separate valve element between the test inlet and said shuttle valve member being actuated at a predetermined high test fluid pressure from the test inlet thereby to simulate the action of the pressure responsive element in the dome of said pressure relief valve.

2. In the fluid system as set forth in claim 1 wherein said separate valve element is in fluid communication with the intermediate fluid chamber of said pilot valve and is responsive thereto for returning the separate valve element after actuation to its initial position after the test fluid pressure is reduced to a predetermined low pressure.

3. In the fluid system as set forth in claim 2 wherein said separate valve element comprises a piston movable between a seated position permitting test fluid to the sensing chamber and an unseated vent position permitting venting of the test fluid, said piston being exposed on one end thereof to dome fluid pressure from said intermediate fluid chamber for urging the piston to seated position.

4. In the fluid system as set forth in claim 3 wherein the fluid pressure responsive area of said piston exposed to test fluid pressure is less than the fluid pressure area of said piston exposed to dome fluid pressure thereby to provide fluid pressure differential areas.

5. In a non-flowing pilot valve having a fluid inlet sensing chamber with a fluid inlet line thereto from an operating fluid pressure, a fluid outlet chamber, and an intermediate fluid chamber between the inlet and outlet chambers blocked in normal operation against fluid communication with said inlet and outlet fluid chambers; an improved fluid testing device for the pilot valve comprising:
   a main body having a test fluid inlet to receive test fluid therein, a test fluid outlet in fluid communication with said test fluid inlet and said fluid inlet line, and a valve chamber between said test fluid outlet and test fluid inlet;
   movable means selectively permitting the higher of either the operating fluid pressure or the test fluid pressure to be in fluid communication with the fluid inlet sensing chamber while blocking the other lower fluid pressure to the sensing chamber;
   a test valve element in said valve chamber movable between a seated position sealing against venting of the test fluid pressure and an unseated portion permitting venting of the test fluid pressure from said test fluid inlet;
   said test valve element being in fluid communication on one side thereof with said intermediate fluid pressure chamber for urging said valve element to seated position, and being in fluid communication on an opposed side thereof with test fluid pressure from said test fluid inlet, said test valve element being unseated upon the test fluid pressure reaching a predetermined amount thereby to vent the test fluid pressure.

6. In a non-flowing pilot valve as set forth in claim 5 wherein said test valve element comprises a movable piston and the fluid pressure responsive area of said piston exposed to test fluid pressure is less than the fluid pressure area of said piston exposed to fluid from said intermediate fluid pressure chamber thereby to provide a fluid pressure differential areas.

7. In a non-flowing pilot valve as set forth in claim 6 wherein said piston has a reduced diameter end portion extending from one end thereof and received within a vent opening, and an O-ring about said reduced diameter end portion seals about said vent opening in the seated position of said piston, the other opposite end of said piston being exposed to fluid pressure from said intermediate fluid chamber.

8. In a non-flowing pilot valve as set forth in claim 5 wherein said movable means comprises a ball shuttle valve member in said fluid inlet line to said sensing chamber exposed on opposite sides thereof to said operating fluid pressure and said test fluid pressure.

9. A non-flowing pilot valve comprising:
   a main body having a fluid inlet sensing chamber, a fluid outlet chamber, and an intermediate fluid pressure chamber between the inlet and outlet chambers;
   a movable valve for the intermediate fluid chamber for sealing against fluid communication with the inlet and outlet fluid chambers in normal operation while permitting under predetermined fluid pressures in said sensing chamber fluid communication at different times between the intermediate fluid pressure chamber and the inlet and outlet chambers;

an operating fluid inlet for said main body, a fluid passage in said body from said operating fluid inlet to the sensing chamber, a test fluid pressure inlet in said body in fluid communication with said fluid passage;

a shuttle valve mounted in said fluid passage and exposed on opposite sides thereof to the operating fluid pressure and the test fluid pressure, said shuttle valve being movable between one position permitting fluid flow between the operating fluid inlet and the fluid sensing chamber while blocking fluid flow from said test fluid inlet, and a second position permitting fluid flow from said test fluid inlet to said sensing chamber while blocking fluid flow from said operating fluid inlet;

a test device for connection to said test fluid inlet having a main body with a test fluid inlet and a test fluid outlet, a valve chamber between said test fluid inlet and outlet, a test valve element in said valve chamber movable between a seated position sealing against the venting of the test fluid and an unseated position permitting venting of the test fluid, the test valve element being in fluid communication on one side thereof with the intermediate fluid pressure chamber for urging the valve element to a seated position, said valve element being unseated upon the test fluid pressure reaching a predetermined amount thereby to permit venting of the test fluid.

10. A non-flowing pilot valve comprising:

a main body including a generally cylindrical lower body portion and a generally cylindrical upper body portion, said upper body portion defining a fluid inlet sensing chamber and having a diaphragm exposed to the fluid pressure therein, a piston secured to the diaphragm and extending within said lower body portion, a fluid outlet chamber in said lower body portion, and an intermediate fluid pressure chamber in the lower body portion between the outlet chamber and the fluid inlet sensing chamber, a movable valve member in said intermediate fluid chamber for blocking direct simultaneous fluid communication between the inlet and outlet fluid chambers;

a fluid inlet bore in said lower body portion extending longitudinally thereof to the fluid inlet sensing chamber, a cross bore in said lower body portion extending through said lower body portion in a direction transversely of the longitudinal axis of said lower body portion and communicating with said fluid inlet bore, an operating fluid pressure inlet port on one end of said cross bore and a test fluid inlet port on the opposite end thereof, a ball shuttle valve positioned in the cross bore at its juncture with the longitudinally extending bore and exposed on opposite sides thereof to operating fluid pressure and to test fluid pressure; and a test device connected to said test fluid inlet port having a main body with a test fluid inlet and a test fluid outlet, a valve chamber between the test fluid inlet and the test fluid outlet, and a valve element in said valve chamber movable between a seated position sealing against venting of the test fluid pressure and an unseated position permitting venting of the test fluid pressure, the valve element being unseated upon the test fluid pressure reaching a predetermined amount to vent the test fluid.

11. A testing device adapted to be removably connected to a non-flowing pilot valve in fluid communication with a fluid responsive member in the dome of a main pressure relief valve to control the relief valve, said testing device simulating the action of the pressure relief valve and comprising:

a main body having a test fluid inlet and a test fluid outlet, a valve chamber between test fluid inlet and the test fluid outlet, and a valve element in said valve chamber movable between a seated position sealing against venting of the test fluid pressure and an unseated position permitting venting of the test fluid pressure;

said valve element being responsive to fluid pressure to the dome of the relief valve from the pilot valve for urging the valve element to seated position against the test fluid pressure.

12. The testing device as set forth in claim 11 wherein said valve element comprises a piston having a fluid pressure responsive area thereof exposed to test fluid pressure less than the fluid pressure area thereof exposed to fluid pressure from the pilot valve thereby to provide fluid pressure differential areas on said piston.

13. A method of testing a non-flowing pilot valve having a fluid inlet sensing chamber, a fluid outlet chamber, and an intermediate fluid chamber between the outlet and inlet chambers blocking simultaneous direct fluid communication between said inlet and outlet chambers, said method comprising the steps of:

providing a source of test fluid pressure to the fluid sensing chamber and simultaneously blocking the flow of operating fluid pressure to the sensing chamber;

providing a test valve element in the test fluid pressure line to the sensing chamber which is actuated upon a predetermined high fluid pressure being reached in said test fluid pressure for venting the test fluid pressure; and increasing the test fluid pressure to said sensing chamber to a predetermined high fluid pressure for actuating said valve element to vent the test fluid pressure.

14. The method as defined in claim 13 and further including the step of providing fluid communication between said valve element and said intermediate fluid chamber for urging the test valve element toward a seated position thereof whereby upon unseating of the valve element and venting of the test fluid pressure to a predetermined low amount, the valve element will reseat under influence of the fluid pressure from the intermediate fluid chamber.

15. The method as defined in claim 14 and further including the step of providing the valve element with a fluid pressure differential area having a larger pressure responsive area exposed to fluid pressure from the intermediate fluid chamber than the pressure responsive area exposed to test fluid pressure.

* * * * *